J. A. HICKS.
FLUID PRESSURE BRAKE SYSTEM.
APPLICATION FILED MAR. 27, 1916.

1,265,450.

Patented May 7, 1918.
3 SHEETS—SHEET 1.

J. A. HICKS.
FLUID PRESSURE BRAKE SYSTEM.
APPLICATION FILED MAR. 27, 1916.

1,265,450.

Patented May 7, 1918.
3 SHEETS—SHEET 3.

UNITED STATES PATENT OFFICE.

JAMES A. HICKS, OF CINCINNATI, OHIO.

FLUID-PRESSURE BRAKE SYSTEM.

1,265,450. Specification of Letters Patent. Patented May 7, 1918.

Application filed March 27, 1916. Serial No. 86,931.

*To all whom it may concern:*

Be it known that I, JAMES A. HICKS, a citizen of the United States, and a resident of Cincinnati, in the county of Hamilton and State of Ohio, have invented certain new and useful Improvements in Fluid-Pressure Brake Systems, of which the following is a specification.

My invention relates to fluid-pressure-operated brakes; and its object is to provide a simple apparatus of this character which will be easy, certain and safe in its operation, and which will be especially suitable for use on automobiles; to maintain the application of the brake indefinitely; and to provide for locking the brake, thus applied, to prevent surreptitious use of the automobile.

My invention consists in the combination of parts and in the details of construction and arrangement of parts as will herein be more fully described and claimed.

Figures 1, 2:
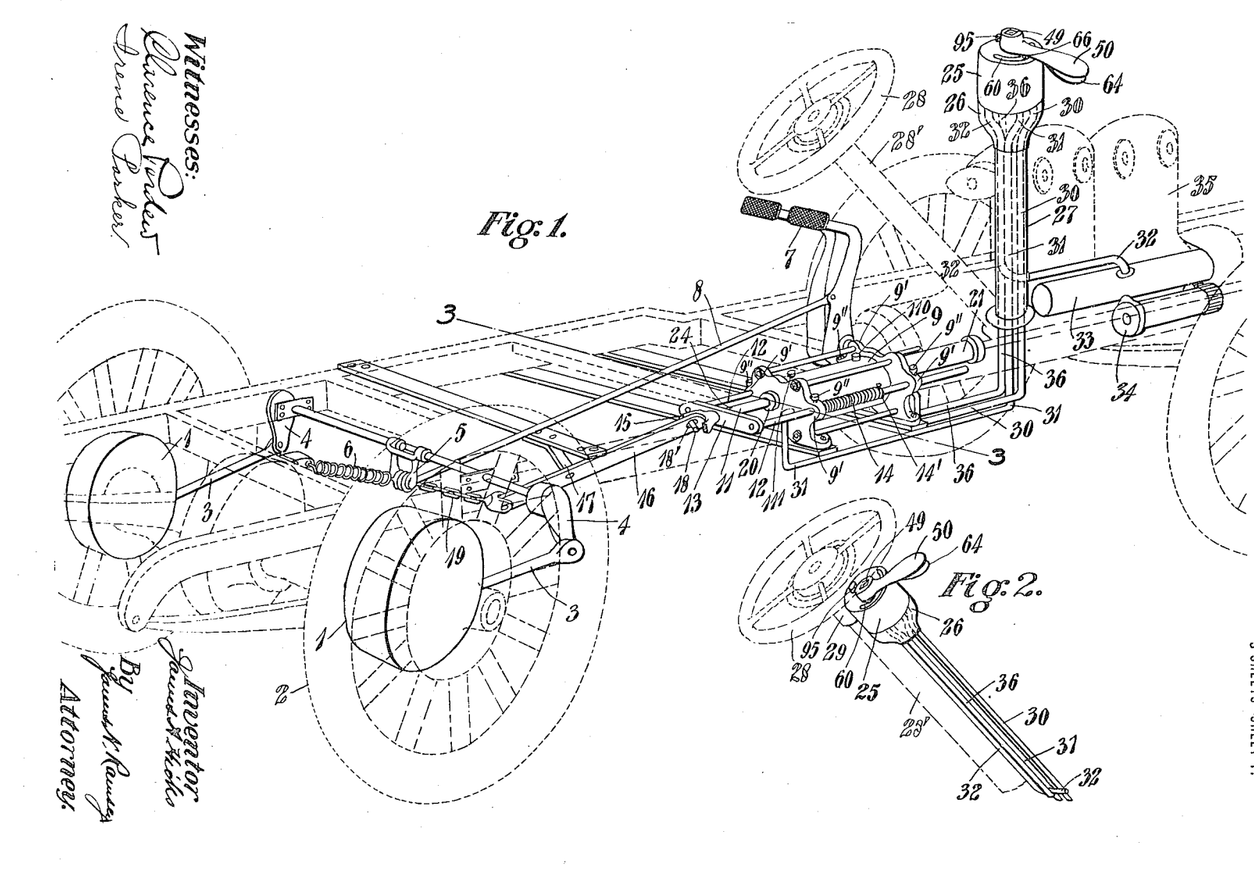
Figure 1 is a general perspective view of an automobile chassis with my invention applied thereto, the chassis being represented by dotted lines only.
Fig. 2 is a view similar to Fig. 1, but showing the steering wheel and post only, and the controller and connections mounted on the steering post.

As I prefer to embody my invention, it is used alternatively with the usual means for operating the brake of an automobile by pressure of the foot. Thus, as shown in Fig. 1, the brakes, of any well-known construction, have their drums 1 mounted on the hubs of the rear wheels 2. They are connected by means of rods 3 and arms 4 to an equalizer 5 controlled by a spring 6, so that the brake of each wheel may operate independently of the other. Then there is a treadle 7 connected to the equalizer arm by the rod 8 for operation of the brakes by the foot of the driver of the vehicle.

My invention comprises the brake cylinder 9 in which slides the plunger 10 (Fig. 3) and plunger-rod 11, which connects to guide-rods 12 sliding in guides 9' on the sides of the cylinder heads, and lubricated by cups 9'', with a rear cross-bar 13 connected to the rear ends of the rods; the plunger-rod 11 also being fixed to and extending back through the cross-bar 13. Helical springs 14, around the guide-rods 12, are compressed between the rear lugs 9' and set collars 14' on the guide-rods 12. Connected to the rear end of the plunger-rod 11, back of the cross-bar 13, is a fork 15; and a lever 16 has a fulcrum 17 on a suitable support on the chassis, from which it extends up between the lugs of the fork 15 with a pin 18 in said lugs and through an arc-shaped slot 18' in the lever, as is shown in Fig. 1, where the fork 15 is indicated with one of its lugs broken away to reveal these parts. The lever extends downward from its fulcrum a much shorter distance than it extends upward therefrom, to have a chain 19 connected to its lower end and to the arm of the equalizer 5. This arrangement is especially useful where the longitudinal space is limited. The arc-shaped slot 18' prevents binding action of the lever 16 being transmitted to the guide-rods 12 and plunger-rod 11. Also, the lever 16, as above described, affords more powerful action.

Thus, when air is introduced into the forward end of the cylinder 9 under pressure, the plunger 10, plunger-rod 11 and guide-frame made up of the guide-rods 12 and cross-bar 13 move backward, pulling forward by means of the lever 15 and chain 19 on the equalizer 5, and accordingly setting the brakes in the same manner as they usually are set by forward pressure on the treadle 7; although considerably more pressure may be applied with air than with the foot of the driver. The connection of the treadle 7 to the brakes by means of the rod 8 does not interfere with this operation, because the treadle 7 will simply be pushed forward the same as it would under pressure of the foot.

However, if there is occasion to use the treadle 7 instead of the air-operated apparatus, the chain 19 will merely become slack on pulling forward on the brake-operating means, so that no motion will be transmitted to the parts associated with the brake cylinder 9.

The guide-frame, with the widely separated and well lubricated bearings in the lugs 9' on the cylinder-heads, affords a firm guidance for the plunger 10 in the cylinder to prevent binding thereof under the variably directed strains of the connections to the brakes. To further provide against this binding, I prefer to extend the plunger-rod 11 through the front cylinder head as well as through the rear one. Rearwardly an ordinary stuffing-box 20 is provided; but forwardly, in order to minimize leakage under the heavy pressure of brake application, I prefer to provide a tubular extension 21 which completely incloses the forward end of the plunger-rod 11.

The rearward end of the plunger-rod 11 has a longitudinal bore 22 forwardly (Fig. 3) with an outer radial opening 23 and an inner radial opening 24 from this bore, which latter comes inside the cylinder when the plunger 10 and rod 11 are at extreme forward position. Thus an exhaust of some of the air in the rear of the cylinder is afforded through this opening 23 and bore 22 and opening 24 in the initial part of the brake application, or in the final part of the brake releasing operation, as will hereinafter be more fully described.

For controlling the application of air to the plunger 10 in the cylinder 9, I provide a controller comprising the valve-casing 25 which, as shown in Fig. 1, is mounted by means of a flaring shell 26 on an upright hollow standard 27 close to the steering-wheel 28, but supported independently of the steering-post 28'. In the modification shown in Fig. 2, the valve-casing 25 is mounted by means of a suitable clip 29 on the steering-post 28' immediately under the steering-wheel 28. This may be more satisfactory to drivers desiring more immediate access to the controller; although it will be understood that as shown in Fig. 1, the controller will be close enough to the steering-wheel 28 to be readily accessible in accordance with the habits of most drivers in driving motor vehicles.

Figures 3, 4, 5, 6:
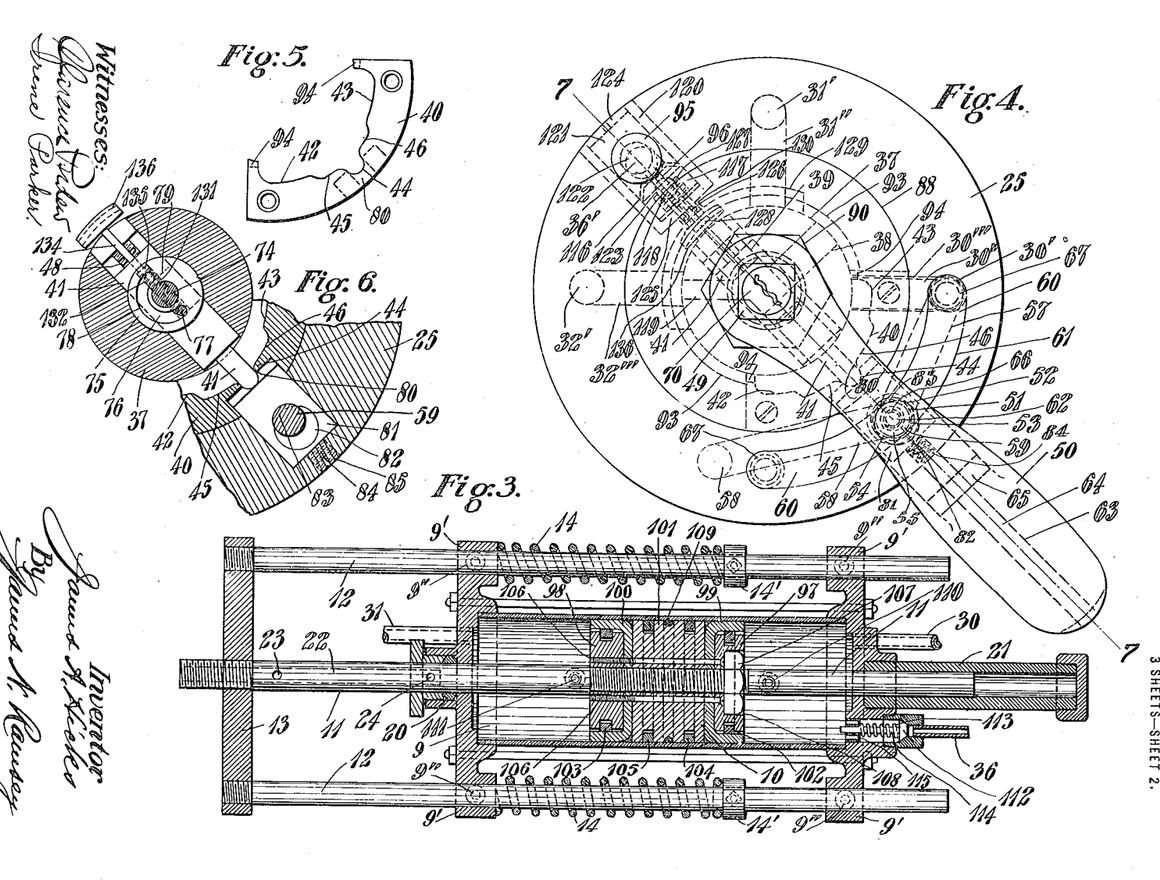
Fig. 3 is an enlarged horizontal cross-section, looking from below, through the brake cylinder and guide frame, on a line corresponding to the line 3—3 of Fig. 1.
Fig. 4 is a plan view of the valve, further enlarged.
Fig. 5 is a detail of the sector.
Fig. 6 is a partial horizontal cross-section on the line 6—6 of Fig. 7.

The cylinder-inlet pipe 30 leads from the end of the cylinder 9, and up through the hollow standard 26, or, as shown in Fig. 3, up along the steering-post 27, into the bottom of the valve-casing 25 (Fig. 7) as does also a brake-release pipe 31 that enters the rear end of the brake-cylinder 9. Also there is a supply pipe 32 leading from a suitable air-storage tank 33 up through the standard 26 or along the steering-post 27 into the bottom of the valve-casing 25.

The tank 33 may have air compressed into it by a suitable pump 34 that may be driven by the motor 35 of the vehicle.

In the center of the valve-casing 25 is the downwardly tapered valve-plug 37, which has through it a lower passage 38 and an upper passage 39. The casing 25 has upright passages 30' and 32' at opposite sides of the plug 37 into which lead the cylinder-inlet pipe 30 and supply pipe 32 respectively. Also there is another upright passage 31' at one side of the valve-plug 37 half way between the passages 30' and 32' around the casing, and with this passage communicates the brake-release pipe 31. The cylinder-inlet and release passages 30' and 31' have ports 30'' and 31'' leading from them in the horizontal plane of the lower passage 38 through the valve-plug 37; while the cylinder-inlet passage 30' also has a port 30''' at its upper end and the supply passage 32' has a port 32''' at its upper end, which ports 30''' and 32''' are in the horizontal plane of the upper passage 39 through the valve-plug 37.

The lower passage 38 of the valve-plug 37 is in two parts 38' and 38'' at right angles to each other, so that one end of the passage may register with the lower cylinder-inlet port 30'' while the other end registers with the release port 31''. The upper passage 39 extends diametrically through the valve-plug 37 parallel with the part 38' of the lower passage 38, and is adapted to register at the same time with the upper cylinder-inlet and supply ports 30''' and 32''', respectively. However, this upper passage 39 is parallel with such part 38' of the lower passage 38 that when the lower passage 38 connects the lower ports 30'' and 31'', the upper passage 39 will be at right angles to the position in which it registers with the upper ports 30''' and 32'''. It follows that when this upper passage 39 does register with these upper ports 30''' and 32''', the part 38'' of the passage 38 that registered with the lower cylinder-inlet port 30'' is then registering with release port 31'', but the other part 38' of his lower passage 38 will be closed by the inner wall of the valve-casing 25. Thus, the brake-releasing means is inoperative.

Therefore, as shown, by a one-quarter turn of the valve-plug 37, either the front end of the cylinder 9 may be connected with the supply-pipe, and the brakes will be applied under the pressure of the air; or the rear end may be connected with the front end, and the air under pressure will be applied from the front side to the rear side of the plunger 10, producing a balanced pressure thereon, and quickly releasing the brakes under the action of the spring 6 and the springs 14.

Figures 7, 8, 9:
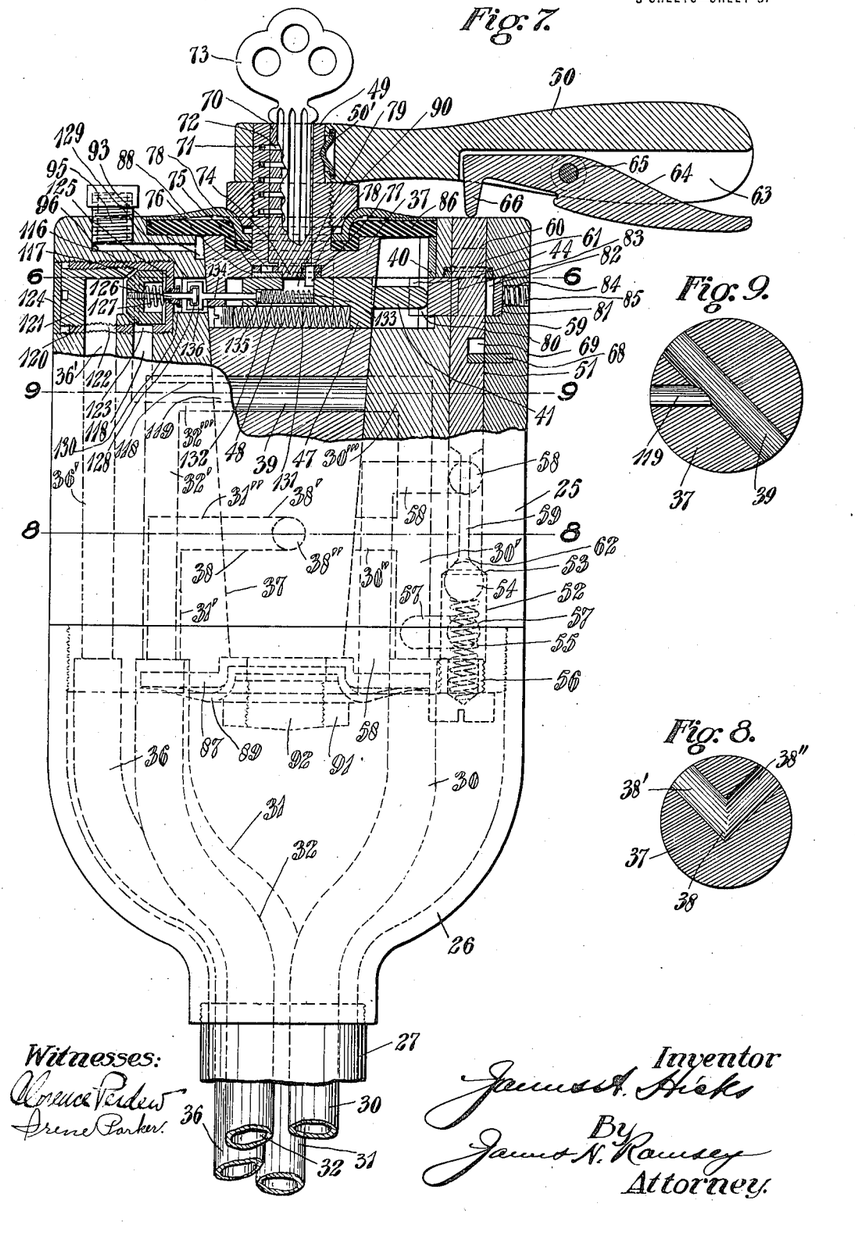
Fig. 7 is a vertical cross-section on the line 7—7 of Fig. 4.
Figs. 8 and 9 are horizontal cross-sections through the valve plug on the lines 8—8 and 9—9, respectively, of Fig. 7.

As shown in Figs. 6 and 7, the valve-plug 37 is turned midway of the above two positions, so that all of the ports are closed. Thus, the brakes having been applied by registering the passages 30''', 39 and 32''', the valve-plug 37 is brought back to this mid-position and maintains the application of the brakes to hold the vehicle stationary.

To govern this operation of the controller, a sector 40, preferably of hardened steel, is provided in the valve-casing 25 near the top of the valve-plug 37, and the valve-plug 37 is provided with a bolt 41 projecting out against the inner edge of the sector 40. This inner edge of the sector 40 comprises terminal parts 42 and 43 farthest radially inward, a middle part 44 farthest radially outward, and parts 45 and 46 intermediate of the middle part 44 and the terminal parts 42 and 43, respectively. Thus, if the bolt 41 enters the middle part 44, it will hold the plug in mid-position. This bolt 41 has, behind a lug 47 on its lower side, a spring 48, allowing it to yield backward out of the part 44 if the valve-plug 37 is turned to the right or left. If turned to the left, the bolt goes onto the part 45, which is of such extent that the bolt will begin to go onto the part 42 about the time the ports begin to register to release the brakes as above described. If the valve-plug 37 is turned to the right, the bolt 41 goes onto the part 46, which is of such extent that the bolt 41 begins to go onto the part 43 about the time the ports begin to register to set the brakes as above described.

The valve-plug 37 has a neck 49 extending up from its top, and a handle 50 is mounted on this neck 49 and extends radially outward substantially on the same radius with the bolt 41.

From the foregoing, it will be seen that the changes in radial disposition of the parts of the inner edge of the segment 40, by offering their resistance to the bolt 41, afford an indication to the driver of the position of the passages in the valve-plug 37 and therefore of the action to be expected of the brake as controlled through these passages.

In moving the handle 50 from mid-position, as shown in Fig. 6, the first resistance will be in the passing of the bolt 41 out of the part 44; and then the next resistance in either direction will indicate either release or application of the brakes.

It will be understood that with the passage 39 fully registered with the passages 30''' and 32''', opening up complete communication between the tank 27 and the front end of the cylinder 9, a very powerful application of the brakes is afforded.

With the parts so proportioned that a slight opening of this communication is afforded just before the bolt 41 reaches the part 43 of the sector 40, all ordinary applications of the brake may be made with the bolt confined to the part 46; and the resistance to passing onto the part 43 will be the indication that an emergency application of the brake is being made. Thus, all that is necessary to make an emergency application, as distinguished from an ordinary one, is to push forward on the handle 50 more forcibly than usually, until stopped by the bolt 41 reaching the end of the sector 40.

Such an application of the brakes on a rapidly moving automobile by the use of compressed air will of course virtually lock the wheels of the vehicle, which, in many situations, will be dangerous, because it will cause skidding of the wheels.

To guard against this danger, I provide the controller with an auxiliary valve, by means of which a partial release of the brake may be effected immediately upon this emergency application, by a mere tightening of the grip of the hand on the handle 50.

Thus, a bore 51 extends down from the top of the valve-casing 25 radially outside the segment 40 and opposite the part 44 thereof, and terminates at the bottom of the valve-casing 25 in a counter-bore 52, at the junction with which is formed an annular valve-seat 53 for a valve-member 54 inserted from the bottom, preferably spherical as shown, and which is pressed up against its seat by a spring 55 held up in the counter-bore 52 by a hollow screw-plug 56.

A passage 57 leads from the cylinder-inlet port 30' into the counter-bore 52 below the valve-seat 53, and a passage 58 leads from the bore 51, above the valve-seat 53, over and down through the bottom of the valve-casing 25 into the hollow standard 26, i. e., to the atmosphere. Fitted into the bore 51 is a stem 59, inserted from the top, and, fixed to its upper end, a segment 60 lying in a correspondingly shaped slot 61 in the top of the valve-casing 25. This slot is deep enough to allow the segment 60 to be pressed down therein along with the stem 59. The lower end part 62 of the stem 59 bears on the valve-member 54, so that when the segment and stem are pressed down the member 54 will be depressed from its seat 53. The diameter of this valve-member 54 is enough less than the counter-bore to allow free passage of air from the front end of the cylinder 9 through the pipe 30, port 30', passage 57, counter-bore 52, bore 51, and passage 58 to the atmosphere, when this valve is thus opened.

In the lower side of the handle 50 is a slot 63 in which swings a grip-lever 64 on a transverse pivot 65. It extends outward from its pivot below the handle 50, for engagement by the fingers in gripping the handle 50, and extends inward from its pivot and has a nose 66 that bears on the top of the segment 60 at all positions of the handle 50. Thus, if the handle 50 and its grip-lever 64 be not gripped tight enough to overcome the resistance of the spring 55 and air pressure below the valve-member 54 no release connection will be made by this means; but if the grip of the hand be tightened beyond this, a release will occur.

It may be stated that drivers having ample presence of mind may be depended upon to make the full emergency application of the brake and then immediately bring the handle back to a partial or full release for balancing the pressures in the two ends of the cylinder through the passage 39 of the valve-plug; but persons likely to become confused will forget to do this in an emergency, with the danger above noted. However, the person becoming so excited as to forget the above operation will, in the excitement, instinctively grip the handle 50 much more tightly than ordinarily; and thus will cause a release, by allowing escape of part of the air from the front end of the cylinder 9 as above described, immediately after the emergency application, even though not thinking to do so.

In order to avoid binding of the stem 59 in the bore 51 when the nose 66 presses on parts of the segment 60 near its ends, I prefer to provide springs 67 (Fig. 4) under the respective ends of the segment 60 in suitable sockets in the valve casing 25 at the ends of and below the slot 61. A pin 68 enters a recess 69 in the stem 59 and limits upward movement of the stem, so that it will never be forced out by the air pressure.

When a motor vehicle is left unattended, it is desirable to be able to lock the brake after it is applied. For this purpose, I mount concentrically in a bore in the neck 49 of the valve-plug 30 a rotatable lock member or locking-cylinder 70 with a series of pins 71 and 72 in the cylinder 70 and neck 49, respectively, adapted to have their meeting ends alined with the bearing of the locking-cylinder 70 in the stem by insertion of a key 73, after the well-known manner of constructing and operating locks of this character. On the lower end of the locking-cylinder 70 is a stem 74, on which is a disk 75 fixed to the stem and another disk 76 loosely mounted on the stem below the fixed disk 75, said loose disk 76 having a pin 77 fixed in it and extending up into a semi-annular slot 78 in the disk 75 and extending down into a rectangular depression 79 in the top of the bolt 41, which, however, opens at only one side of the bolt 41 thus limiting the disk 76 to one-half revolution in either direction. This slot 78 is shorter than the stroke of the pin 77, and when the disk 76 is turned through a one-half revolution, the bolt 41 will be forced out through a radial opening 80 in the part 44 of the sector 40. Here it will engage with the auxiliary-valve bolt 81 which has an opening 82 that coincides with the bore 51 to allow the free sliding of the auxiliary-valve stem 59 except when the bolt 41 engages with it, whereupon it is pushed outward so that the inner side of its opening 82 enters a recess 83 in the stem 59. A spring 84 held in the casing by a blind plug 85 forces the bolt 81 back to release the stem 59 upon disengagement of the bolt 41.

Thus, if the key 73 is inserted and the cylinder 70 turned a full revolution, one end of its semi-annular slot 78 will cause one-half revolution of the disk 76 and result in locking the valve-plug 30 against turning and the stem 59 against depression; so that there can be no release of the brake. Then the key 73 may be withdrawn. To unlock the device, the key 73 is inserted and turned in the opposite direction; upon which the disk 75, engaging the opposite end of its slot 78 with the pin 77, will cause unlocking of the plug 37 and stem 59. Then the key 73 may be withdrawn, and the parts may be held in unlocked position. It will be noted the pin 77 now acts as a guard to prevent entrance of the bolt 41 into the radial opening 80, but at the same time allows all other operations of the bolt 41 in the ordinary operation of the valve as hereinbefore described.

It will also be noted that this lock differs from other locks of this character, as used on doors and the like, in that the key may be withdrawn either when locked or when unlocked, and either the locked or unlocked position will be maintained ready for insertion of the key to change the position.

The valve-plug 37 has, at its upper and lower ends, elastic washers 86 and 87 and resilient washers 88 and 89, respectively, the latter lying over the former, with nuts 90 and 91 screwed onto the neck 49 and onto a lower neck 92 of the plug, respectively. It will be noted that the resilient washers 88 and 89 are made of wing-shaped cross section with thin peripheries, while the nuts bear on the thicker convex inner annular parts and wedge down therein. Such a combination of washers provides a very effective packing around the plug 37 between it and the casing 25, to prevent leakage of air from the controller.

In addition to providing for locking of the parts, the handle 50 is preferably made removable, having a flat spring 50' to snap into a depression on the side of the stem 49 to hold the handle 50 snugly on the stem or allowing it to be readily taken therefrom. Thus the handle 50 with its grip-lever 64 may be carried away by the driver, along with the key 73.

Under the upper washers is an oil groove 93 in the valve-casing 25, extending around the plug from one end of the sector 40 to the other, and communicating through small holes 94 with the space inside the sector 40; and an oil cup 95 on the top of the valve-casing 25 opposite to the sector 40 has a passage 96 leading to about the middle of the oil groove 93.

It will be noted that oil from the oil cup 95 passing through the passage 96 and groove 93 to the space within the sector 40 will lubricate not only the plug 37 in its bearing in the valve-casing 25, but will also lubricate the bolt 41 and all of the locking and auxiliary-valve parts associated therewith as above described, as well as lubricate the bearings of the washers against the casing around the plug; and all of this lubrication may be afforded without disassembling any part of the valve.

The plunger 10 in the cylinder 9 is also constructed to minimize leakage. It preferably consists of forward and rear terminal sections 97 and 98 in cups 99 and 100, preferably of leather, with a middle part 101 interposed between the cups. Metal expansion rings 102 and 103 pressing out from the parts 97 and 98 against the inner sides of the cups spread them against the cylinder walls, and other rings 104 and 105, in the middle part 101, press directly against the cylinder walls. This entire plunger structure is held together by screws 106 parallel to its axis, and the front end of the plunger-rod 11 is reduced and threaded and screwed through the parts 98, 101 and 97 with a lock-nut 107 at the front, which is screwed up against the front side of the part 97 within a recess 108 therein. The middle part 101 has a circumferential oil groove 109 in its middle, next to the cylinder walls, registering with oil cups 110 and 111 at opposite ends of the stroke. This lubricates the parts, and also provides an effective liquid seal against leakage between the two ends of the cylinder.

It will be seen that great precaution is taken by means in the cylinder and in the controller to prevent leakage; so that the locking of the valve plug, in its mid-position, may be depended upon to prevent surreptitious use of the vehicle as before pointed out. However, even with all of these precautions, such slight leakage may be possible, after the vehicle stands a long while, as will result in a sufficient drop of pressure in the front end of the cylinder to release the brakes, even though the plug is locked in mid-position.

To counteract such slight leakage, I provide another system of connections through the controller from the tank 33 and the front end of the cylinder 9, that will be open, very slightly, only when the controller is locked; and which will thus permit a very small supply of air, under the pressure in the tank 33, to the front end of the cylinder, whenever there is a slight drop of the pressure in this front end, below that in the tank 33.

Thus, the replenishing pipe 36, before alluded to, enters the front end of the cylinder (Fig. 3) and has interposed in it a check-valve 112 seated by movement outwardly of the cylinder, and held against its seat by a spring 113 around its stem 114, which is guided in a perforated plug 115, between which plug 115 and the check-valve 112 the spring 113 is compressed. With this arrangement, any drop of pressure in the front end of the cylinder 9 below that in the replenishing pipe 36 will result in a slight opening of the check-valve 112, until the air is replenished in said front end, reëstablishing the balance of pressure and permitting the valve 112 to close again.

If this replenishing pipe 36 were directly connected with the tank 27, there would be a constant replenishing of the air in the front end of the cylinder 9, so that the brakes would always be set. Accordingly I lead the replenishing pipe 36 to the upright replenishing passage 36' in the valve-casing 25, located angularly mid-way between the release passage 31' and supply passage 32', i. e., opposite to the auxiliary valve. The upper end of this passage 36' communicates with a replenishing-valve chamber 116, in which is slidably mounted a replenishing valve 117, approximately in horizontal alinement with the bolt 41 across the upper end of a replenishing port 118 that leads downward and radially over to the side of the valve-plug 37, so as to be in communication with the straight passage 39 in the valve-plug when the valve-plug is turned to its mid-position for locking. Then the communication with the tank 33 is here completed by a short branch passage 119 that leads from the side of the straight passage 39 in the valve-plug 37 at such an angle as to register with the supply port 32''', when the valve-plug 37 is in said mid-position.

The replenishing valve 117 seats radially outward and is designed to permit the passage of a sufficient amount of air on a very slight recession from its seat. As here shown, a shell 120 screwed into a suitable opening in the side of the valve casing 25, has a plug 121 screwed into it, with a hollow interior communicating with the upper end of said passage 36' through a hole 122 in the shell 120; and with the seat for the replenishing valve 117 formed on its inner end. The chamber 116 communicates with the port 118 through a hole 123 in the shell 120. To guard against ready discovery of this structure, there may be a blind plug 124 over the ends of the shell 120 and plug 121. The shell 120 has a closed rear end 125, and the replenishing valve 117 has a stem 126 extending back through the rear end 125, and is seated by a helical spring 127 compressed around the stem 126 between the replenishing-valve 117 and the rear end 125; said valve 117 being preferably continued back around the spring, and thus having greater length and better guidance.

The inner end of the stem 126 has a head 128 entering a segmental groove 129, next to the plug, through a slot 130 in the material of the valve-casing 25 back of the shell 120, (Fig. 4).

The bolt 41 has, in the bottom of its depression 79, a recess 131 in which a spring 132 is confined around a stud 133 and behind a stem 134 extending out through the end of the bolt 41 into the segmental groove 129, with a head 135 inside the recess 131 against the spring 132, which causes the stem 134 to be pulled with the bolt 41 when the bolt 41 is shot over to lock the controller. Out in the segmental groove 129, the stem has laterally opening jaws 136 that receive the head 128 of the valve stem 126 when the plug 37 is swung around to its mid-position. Thus it will be seen that when the bolt 41 is thrown to lock the controller, it will pull the replenishing valve 117 open, and will permit the passage of a slight amount of air from the tank 33 to the forward end of the cylinder 9, through the check-valve 112. However, at all other times, even with the valve-plug 37 thrown into mid-position but not locked, the replenishing-valve 117 will be closed. Thus, for all momentary holding of the valve-plug 37 in mid-position, as in braking the vehicle while going down grades, or in any other momentary use of the air brake with the valve-plug 37 in this position, there is no passage of air through this additional connection. Thus, there is no use of the air in this way when it is not needed and when it would interfere with correct operation; but only when it is desired to prevent surreptitious use of the vehicle, i. e. when the controller is locked.

It will be seen that the spring 132, in the bolt 41, allows different degrees of movement of this bolt and the replenishing valve 117, so that said replenishing valve 117 will remain closed at all movements except the locking movement of the bolt 41, as is required. The jaws 136, merely bearing against the side of the segmental groove 129 under this pressure of the spring 132, are ready to slip over the head 128 as the jaws 136 are swung around with the valve-plug 37, and are broad enough not to pass out into the slot 130 through which the stem 126, with its head 128, projects into the segmental slot 129.

While I have shown and described in considerable detail an example of an embodiment of my invention, I do not wish to be understood as being limited to the specific details shown, since my invention is capable of considerable modification without departure from the scope and spirit thereof, as expressed in the following claims:

1. In combination with a brake, an element connected to said brake to operate said brake in one direction or the other, means to supply fluid under pressure to one side of said element to operate said brake in one direction, and a single controlling device comprising means to discontinue supply of fluid to said side of said element, and to confine the fluid thus supplied to said side of said element, and comprising means to apply some of said confined fluid to the other side of said element to operate said brake in the other direction and means to permit escape of this fluid thus supplied, when the brake is operated in the one direction.

2. In combination with a brake, an element connected to said brake to operate said brake in one direction or the other, means to supply fluid under pressure to one side of said element to operate said brake in one direction, means to discontinue supply of fluid to said side of said element, and to confine the fluid thus supplied to said side of said element, and means to replenish said fluid while thus confined.

3. In combination with a brake, an element connected to said brake to operate said brake in one direction or the other, means to supply fluid under pressure to one side of said element to operate said brake in one direction, means to discontinue supply of fluid to said side of said element, and to confine the fluid thus supplied to said side of said element, means to apply some of said confined fluid to the other side of said element to operate said brake in the other direction, means to confine this fluid to this other side of said element, and means operated by said element to permit exhaustion of said fluid from this other side of said element during an initial part of the operation of the brake in one direction or the final part of the operation of the brake in the other direction.

4. In combination with a brake, an element connected to said brake to operate said brake in one direction or the other, means to supply fluid under pressure to one side of said element to operate said brake in one direction, means to discontinue supply of fluid to said side of said element, and to confine the fluid thus supplied to said side of said element, means to apply some of said confined fluid to the other side of said element to operate said brake in the other direction, and means to permit escape of some of said fluid from the one side of said element to the atmosphere while fluid is being supplied to said side, while it is otherwise confined thereto, or while it is being admitted to said other side of said element.

5. In combination with a brake, an element connected to said brake to operate said brake in one direction or the other, means to supply fluid under pressure to one side of said element to operate said brake in one direction, means to discontinue supply of fluid to said side of said element, and to confine the fluid thus supplied to said side of said element, means to replenish said fluid while it is thus confined, means to apply some of said confined fluid to the other side of said element to operate said brake in the other direction, and means to permit escape of some of said fluid from the one side of said element to the atmosphere, while fluid is being supplied to said side, while it is otherwise confined thereto, or while it is being admitted to said other side of said element.

6. In combination with a brake, an element connected to said brake to operate said brake in one direction or the other, means to supply fluid under pressure to one side of said element to operate said brake in one direction, means to discontinue supply of fluid to said side of said element, and to confine the fluid thus supplied to said side of said element, means to apply some of said confined fluid to the other side of said element to operate said brake in the other direction, means to confine this fluid to this other side of said element, means operated by said element to permit exhaustion of said fluid from this other side of said element during an initial part of the operation of the brake in one direction or the final part of the operation of the brake in the other direction, and means to permit escape of some of said fluid from the one side of said element to the atmosphere while fluid is being supplied to said side, while it is otherwise confined thereto, or while it is being admitted to said other side of said element.

7. In combination with a brake, fluid-pressure-operated applying means for applying said brake, fluid-pressure-operated releasing means for releasing said brake, supply means to supply fluid under pressure, an applying inlet connection to said applying means, a releasing inlet connection to said releasing means, a supply connection from said supply means, a replenishing connection to said applying means, and means to connect said applying inlet connection with said supply connection, to the exclusion of said releasing inlet connection, or to connect both of said inlet connections together to the exclusion of said supply connection, or to connect said replenishing connection with said supply connection to the exclusion of all of the others of said connections.

8. In combination with a brake, fluid-pressure-operated applying means for applying said brake, fluid-pressure-operated releasing means for releasing said brake, supply means to supply fluid under pressure, an applying inlet connection to said applying means, a releasing inlet connection to said releasing means, a supply connection from said supply means, and means manually actuated either to connect said applying inlet connection to said supply connection to the exclusion of said releasing inlet connection, or to connect said inlet connections together to the exclusion of said supply connection, or to disconnect said supply connections from all of the others of said connections, and means manually actuated for opening said applying inlet connection to the atmosphere during any relation of said connections to each other.

9. In combination with a brake, means for manually operating said brake, a rod operatively connecting this means to said brake, and means flexibly connected to said brake for operating said brake by power.

10. In combination with a brake, means for manually operating said brake, a rod operatively connecting this means to said brake, a lever having a fixed fulcrum, means flexibly connecting said lever to said brake, and means connected to said lever for operating said brake by power.

11. In combination with a brake, a cylinder, with closed ends, a plunger in said cylinder, a plunger-rod connected to said plunger and extending through an end of the cylinder, a lever with a fixed fulcrum nearer to one of its ends than to its other end, with its end part farther from the fulcrum connected to said plunger rod, a flexible operative connection from the other end part of said lever to said brake, and means for applying fluid pressure to said plunger.

12. In combination with a brake, a cylinder, a plunger in said cylinder, a plunger-rod connected to said plunger and projecting from the cylinder, a pin fixed to the plunger rod where it projects from the cylinder, a lever provided with an arc-shaped slot receiving said pin, an operative connection from said lever to said brake, and means for applying fluid pressure to said plunger.

13. In combination with a brake, a cylinder, a plunger in said cylinder, a plunger-rod connected to said plunger and projecting from the cylinder, a pin fixed to the plunger-rod where it projects from the cylinder, a lever with a fulcrum nearer to one of its ends than to its other end, with its end part farther from the fulcrum provided with an arc-shaped slot receiving said pin, a flexible operative connection from the other end part of said lever to said brake, and means for applying fluid pressure to said plunger.

14. In combination with a brake, fluid-pressure-operated means for applying or releasing said brake, a fluid-conducting connection to said fluid-pressure-operated means, supply means to supply fluid under pressure to said fluid-pressure-operated means through said fluid-conducting connection, a controller to control application and release of said brake, interposed in said connection, and means for locking said controller to prevent release of said brake.

15. In combination with braking means, fluid-pressure-operated means for applying or releasing all of said braking means, a fluid-conducting connection to said fluid-pressure-operated means, supply means to supply fluid under pressure to said fluid-pressure-operated means through said fluid-conducting connection, and a controller manually actuated to permit either application or release of all of said braking means, interposed in said connection, comprising a manually actuated auxiliary valve to modify said pressure in said fluid-pressure-operated means.

16. In combination with a brake, a cylinder, a plunger in said cylinder, operative connection from said plunger to said brake, a fluid-conducting connection to one end of said cylinder, exclusively of any other cylinder, to apply fluid under pressure to said plunger to apply said brake, supply means to supply fluid under pressure through said fluid-conducting connection, and a controller manually actuated to permit either application or release of said brake, interposed in said connection, comprising a manually actuated auxiliary valve to relieve said pressure in said end of said cylinder.

17. In combination with a brake, fluid-pressure-operated means for applying or releasing said brake, a fluid-conducting connection to said fluid-pressure-operated means, supply means to supply fluid under pressure to said fluid-pressure-operated means through said fluid-conducting connection, a controller to control application and release of said brake, interposed in said connection, comprising an auxiliary valve to modify said pressure, and means for locking said controller and said auxiliary valve to prevent release of said brake.

18. In combination with a brake, a cylinder, a plunger in said cylinder, an operative connection from said plunger to said brake, a fluid conducting connection to one end of said cylinder to apply fluid under pressure to said plunger to apply said brake, supply means to supply fluid under pressure through said fluid-conducting connection, and a controller to control application and release of said brake, interposed in said connection, comprising an auxiliary valve to relieve said pressure in said end of said cylinder, and means for locking said controller and said auxiliary valve to prevent release of said brake.

19. In combination with a brake, fluid-pressure-operated means for applying or releasing said brake, a fluid-conducting connection to said fluid-pressure-operated means, supply means to supply fluid under pressure to said fluid-pressure-operated means through said fluid-conducting connection, a controller, interposed in said connection, comprising an auxiliary valve to modify said pressure, an operating handle manually moved to different positions for operating said controller either to apply or release said brake, and means, gripped with said handle, for operating said auxiliary valve at any position of said handle.

20. In combination with a brake, a cylinder, a plunger in said cylinder, operative connection from said plunger to said brake, a fluid-conducting connection to one end of said cylinder to apply fluid under pressure to said plunger to apply said brake, supply means to supply fluid under pressure through said fluid-conducting connection, a controller, interposed in said connection, comprising an auxiliary valve to relieve said pressure in said end of said cylinder, an operating handle manually moved to different positions for operating said controller either to apply or release said brake, and means, gripped with said handle, for operating said auxiliary valve at any position of said handle.

21. In combination with a brake, fluid-pressure-operated means for applying or releasing said brake, a fluid-conducting connection to said fluid-pressure-operated means, supply means to supply fluid under pressure to said fluid-pressure-operated means through said fluid-conducting connection, a controller interposed in said connection, comprising an auxiliary valve to modify said pressure, an operating handle moved to different positions for operating said controller to apply or release said brake, means, gripped with said handle, for operating said auxiliary valve at any position of said handle, and means for locking said controller and said auxiliary valve to prevent release of said brake.

22. In combination with a brake, a cylinder, a plunger in said cylinder, an operative connection from said plunger to said brake, a fluid-conducting connection to one end of said cylinder to apply fluid under pressure to said plunger to apply said brake, supply means to supply fluid under pressure through said fluid-conducting connection, a controller, interposed in said connection, comprising an auxiliary valve to relieve said pressure in said end of said cylinder, an operating handle moved to different positions for operating said controller to apply or release said brake, means, gripped with said handle, for operating said auxiliary valve at any position of said handle, and means for locking said controller and said auxiliary valve to prevent release of said brake.

23. In combination with a brake, fluid-pressure-operated means for applying or releasing said brake, a fluid-conducting connection to said fluid-pressure-operated means, supply means to supply fluid under pressure to said fluid-pressure-operated means through said fluid-conducting connection, a controller interposed in said connection, comprising a part adapted to be brought into position to confine said fluid to said fluid-pressure-operated means, and a replenishing connection to said fluid-pressure-operated means to replenish said fluid thus confined.

24. In combination with a brake, fluid-pressure-operated means for applying or releasing said brake, a fluid-conducting connection to said fluid-pressure-operated means, supply means to supply fluid under pressure to said fluid-pressure-operated means through said fluid-conducting connection, a controller interposed in said connection, comprising a part adapted to be brought into position to confine said fluid to said fluid-pressure-operated means, a replenishing connection to said fluid-pressure-operated means, and a check valve in said replenishing connection, normally closed, but opening to replenish said fluid thus confined when the pressure of said confined fluid falls below the pressure in said replenishing connection.

25. In combination with a brake, fluid-pressure-operated means for applying or releasing said brake, a fluid-conducting connection to said fluid-pressure-operated means, supply means to supply fluid under pressure to said fluid-pressure-operated means through said fluid-conducting connection, a controller interposed in said connection, comprising a part adapted to be brought into position to confine said fluid to said fluid-pressure-operated means, locking means to lock said part in its fluid-confining position, a replenishing connection to said fluid-pressure-operated means to replenish said fluid thus confined, a replenishing valve interposed in and normally closing said replenishing connection, and an operative connection between said replenishing valve and said locking means whereby said replenishing valve is opened when said locking means locks said part.

26. In combination with a brake, a cylinder, a plunger in said cylinder, an operative connection from said plunger to said brake, a fluid-conducting connection to one end of said cylinder to apply fluid under pressure to said plunger to apply said brake, supply means to supply fluid under pressure through said fluid-conducting connection, a controller interposed in said connection, comprising a part adapted to be brought into position to confine said fluid to said end of said cylinder and said plunger, locking means to lock said part in its fluid-confining position, a replenishing connection to said end of said cylinder to replenish said fluid thus confined, a replenishing valve interposed in and normally closing said replenishing connection, and an operative connection between said replenishing valve and said locking means whereby said replenishing valve is opened when said locking means lock said part.

27. In combination with a brake, fluid-pressure-operated means for applying or releasing said brake, a fluid-conducting connection to said fluid-pressure-operated means, supply means to supply fluid under pressure to said fluid-pressure-operated means through said fluid-conducting connection, a controller interposed in said connection, comprising a part adapted to be brought into position to confine said fluid to said fluid-pressure-operated means, an auxiliary valve to modify the pressure of the confined fluid means, for operating the auxiliary valve while the aforesaid part is in any of its positions, locking means to lock said part in its fluid-confining position and to lock said auxiliary valve to prevent its operation, a replenishing connection to said fluid-pressure-operated means to replenish said fluid thus confined, a replenishing valve interposed in and normally closing said replenishing connection, and an operative connection between said replenishing valve and said locking means whereby said replenishing valve is opened when said locking means locks said part and said auxiliary valve.

28. In combination with a brake, a cylinder, a plunger in said cylinder, an operative connection from said plunger to said brake, a fluid-conducting connection to one end of said cylinder to apply fluid under pressure to said plunger to apply said brake, supply means to supply fluid under pressure through said fluid-conducting connection, a controller interposed in said connection, comprising a part adapted to be brought into position to confine said fluid to said end of said cylinder and said plunger, an auxiliary valve to relieve the pressure of said confined fluid, means for operating this auxiliary valve while the aforesaid part is in any of its positions, locking means to lock said part in its fluid-confining position and to lock said auxiliary valve to prevent its operation, a replenishing connection to said end of said cylinder to replenish said fluid thus confined, a replenishing valve interposed in and normally closing said replenishing connection, and an operative connection between said replenishing valve and said locking means whereby said replenishing valve is opened when said locking means locks said part and said auxiliary valve.

29. In combination with a brake, fluid-pressure-operated means for applying or releasing said brake, a fluid-conducting connection to said fluid-pressure-operated means, supply means to supply fluid under pressure to said fluid-pressure-operated means through said fluid-conducting connection, a controller interposed in said connection, comprising a part adapted to be brought into position to confine said fluid to said fluid-pressure-operated means, an auxiliary valve to modify the pressure of said confined fluid, means for operating this auxiliary valve while the aforesaid part is in any of its positions, locking means to lock said part in its fluid-confining position, and to lock said auxiliary valve to prevent its operation, a replenishing connection to said fluid-pressure-operated means, a check valve in said replenishing connection, normally closed, but opening to replenish said fluid thus confined when the pressure of said confined fluid falls below the pressure in said replenishing connection, a replenishing valve interposed in and normally closing said replenishing connection, and an operative connection between said replenishing valve and said locking means whereby said replenishing valve is opened when said locking means locks said part and said auxiliary valve.

30. In combination with a brake, a cylinder, a plunger in said cylinder, an operative connection from said plunger to said brake, a fluid-conducting connection to one end of said cylinder to apply fluid under pressure to said plunger to apply said brake, supply means to supply fluid under pressure through said fluid-conducting connection, a controller interposed in said connection, comprising a part adapted to be brought into position to confine said fluid to said end of said cylinder and said plunger, an auxiliary valve to relieve the pressure of said confined fluid, means for operating this auxiliary valve while the aforesaid part is in any of its positions, locking means to lock said part in its fluid-confining position, and to lock said auxiliary valve to prevent its operation, a replenishing connection to said end of said cylinder, a check valve in said replenishing connection adjacent to said cylinder, normally closed, but opening to replenish said fluid thus confined when the pressure in said end of the cylinder falls below the pressure in said replenishing connection, a replenishing valve interposed in and normally closing said replenishing connection, and an operative connection between said replenishing valve and said locking means whereby said replenishing valve is opened when said locking means locks said part and said auxiliary valve.

31. In combination with a brake, fluid-pressure-operated applying means for applying said brake, fluid-pressure-operated releasing means for releasing said brake, supply means to supply fluid under pressure, an applying inlet connection to said applying means, a releasing inlet connection to said releasing means, a supply connection from said supply means, and a controller connected to said inlet connections and to said supply connection, comprising relatively movable parts with passages in both of said parts spaced apart in direction at an angle to the direction of relative movement of said parts, and having an extent of relative movement near one end of which some of said passages register to connect said applying inlet connection to said supply connection to the exclusion of said releasing inlet connection, and near the other end of which others of said passages register to connect said releasing inlet connection to one of the others of said connections, and in a middle part of which not any of said connections are connected together.

32. In combination with a brake, fluid-pressure-operated applying means for applying said brake, fluid-pressure-operated releasing means for releasing said brake, supply means to supply fluid under pressure, an applying inlet connection to said applying means, a releasing inlet connection to said releasing means, a supply connection from said supply means, a controller connected to said inlet connections and to said supply connection, comprising relatively movable parts with passages in both of said parts spaced apart at an angle to the direction of relative movement of said parts, and having an extent of relative movement near one end of which some of the passages register to connect said applying inlet connection to said supply connection to the exclusion of said releasing inlet connection, and near the other end of which others of said passages register to connect said inlet connections together to the exclusion of said supply connection, and in the middle part of which not any of said connections are connected together.

33. In combination with a brake, fluid-pressure-operated applying means for applying said brake, fluid-pressure-operated releasing means for releasing said brake, supply means to supply fluid under pressure, an applying inlet connection to said applying means, a releasing inlet connection to said releasing means, a supply connection from said supply means, and a controller comprising a casing, and a plug rotatably fitted in said casing, with distinct passages through it, said casing having applying and supply ports communicating, respectively, with said applying inlet connection and said supply connection, one of said passages registering with said applying and supply ports when the plug is in one position, and said casing having a release port intermediate of said applying and supply ports around the plug, communicating with said releasing inlet connection, the other passage in said plug registering with said release port and with said applying port when the plug is in another position, and not any of these passages registering when the plug is in a mid-position.

34. In combination with a brake, fluid-pressure-operated applying means for applying said brake, fluid-pressure-operated releasing means for releasing said brake, supply means to supply fluid under pressure, an applying inlet connection to said applying means, a releasing inlet connection to said releasing means, a supply connection from said supply means, a controller connected to said inlet connections and to said supply connection, comprising parts manually relatively movable in either direction with passages in both of said parts, and having an extent of relative movement near one end of which some of said passages register to connect said applying inlet connection to said supply connection to the exclusion of said releasing inlet connection, and near the other end of which others of said passages register to connect said inlet connections together to the exclusion of said supply connection, and in a middle part of which not any of said connections are connected together, an atmospheric connection from said applying inlet connection to the atmosphere, an auxiliary valve interposed in and normally closing said atmospheric connection, and means for manually opening said auxiliary valve during any relative positions of said parts of said controller.

35. In combination with a brake, fluid-pressure-operated applying means for applying said brake, fluid-pressure-operated releasing means for releasing said brake, supply means to supply fluid under pressure, an applying inlet connection to said applying means, a releasing inlet connection to said releasing means, a supply connection from said supply means, a replenishing connection to said applying means, and a controller connected to said inlet connections, to said supply connection, and to said replenishing connection, comprising relatively movable parts with passages in both of said parts having an extent of relative movement near one end of which some of said passages register to connect said applying inlet connection to said supply connection to the exclusion of said releasing inlet connection, and near the other end of which others of said passages register to connect said inlet connections together to the exclusion of said supply connection, and in a middle part of which still others of said passages register to connect said replenishing connection with said supply connection to the exclusion of both of said inlet connections.

36. In combination with a brake, fluid-pressure-operated applying means for applying said brake, fluid-pressure-operated releasing means for releasing said brake, supply means to supply fluid under pressure, an applying inlet connection to said applying means, a releasing inlet connection to said releasing means, a supply connection from said supply means, a replenishing connection to said applying means, and a controller comprising a casing, and a plug rotatably fitted in said casing, with distinct passages through it, one of which passages has a branch passage, said casing having applying and supply ports communicating, respectively, with said applying inlet connection and said supply connection, said passage that has the branch passage registering with said applying and supply ports when the plug is in one position, said casing having a release port intermediate of said applying and supply ports around the plug, communicating with said releasing inlet connection, said other passage in the plug registering with said release port and with said applying port when the plug is in another position and not any of these passages registering when the plug is in a mid-position, said casing having a replenishing port communicating with said replenishing connection, and so located that when the plug is in said mid-position its passage that has the branch passage registers with this replenishing port, and said branch passage being so directed that it registers with said supply port when the plug is in said mid-position.

37. In combination with a brake, fluid-pressure-operated applying means for applying said brake, fluid-pressure-operated releasing means for releasing said brake, supply means to supply fluid under pressure, an applying inlet connection to said applying means, a releasing inlet connection to said releasing means, a supply connection from said supply means, a replenishing connection to said applying means, and a controller connected to said inlet connections, to said supply connection, and to said replenishing connection, comprising relatively movable parts with passages in both of said parts having an extent of relative movement near one end of which some of said passages register to connect said applying inlet connection to the exclusion of said releasing inlet connection, and near the other end of which others of said passages register to connect said inlet connections together to the exclusion of said supply connection, and in a middle part of which still others of said passages register to connect said replenishing connection with said supply connection to the exclusion of both of said inlet connections, and locking means to lock said parts together in said middle part of their relative movement.

38. In combination with a brake, fluid-pressure-operated applying means for applying said brake, fluid-pressure-operated releasing means for releasing said brake, supply means to supply fluid under pressure, an applying inlet connection to said applying means, a releasing inlet connection to said releasing means, a supply connection from said supply means, a replenishing connection to said applying means, and a controller connected to said inlet connections, to said supply connection, and to said replenishing connection, comprising relatively movable parts with passages in both of said parts having an extent of relative movement near one end of which some of said passages register to connect said applying inlet connection to said supply connection to the exclusion of said releasing inlet connection, and near the other end of which others of said passages register to connect said inlet connections together to the exclusion of said supply connection, and in a middle part of which still others of said passages register to connect said replenishing connection with said supply connection to the exclusion of both of said inlet connections, locking means to lock said parts together in said middle part of their relative movement, a replenishing valve interposed in and normally closing said replenishing connection, and means whereby said replenishing valve opens said replenishing connection only when said parts are locked together.

39. In combination with a brake and fluid-pressure-operated means for operating said brake, a controller comprising a casing, and rotatable means in said casing, said rotatable means and said casing having means whereby the brake is applied or released accordingly as the rotatable means is turned in one direction or the other, and whereby said brake has its application maintained when the rotatable means is held in a mid-position, a sector in said casing at one side of said rotatable means having a middle part and intermediate parts and end parts of successively decreasing displacement from the center of the rotatable means in both directions from the middle part, and a bolt yieldably mounted to slide transversely in said rotatable means, to yieldably engage with said parts of said sector successively as said rotatable means is rotated one way or the other from mid-position, and thus yield farther radially inwardly upon passing from each part to the next, thereby affording indication, by the resistance to the turning of the rotatable means, of the position of the rotatable means in the casing.

40. In combination with a brake and fluid-pressure-operated means for operating said brake, a controller comprising relatively movable parts having means whereby the brake is applied or released accordingly as the parts are relatively moved in one direction or the other, and whereby said brake has its application maintained when the rotatable parts are held in a middle part of their relative movement, locking means to lock said parts together in said middle part of their relative movement, a replenishing connection to said fluid-pressure-operated means, a replenishing valve interposed in and normally closing said replenishing connection, means whereby said replenishing valve opens said replenishing connection only when said parts are locked together, an atmospheric connection from said fluid-pressure-operated means to the atmosphere, an auxiliary valve interposed in and normally closing said atmospheric connection, means for opening said auxiliary valve during any relative positions of said parts of said controller, and means for locking said auxiliary valve against opening when said parts of said controller are locked together.

41. In combination with a brake and fluid-pressure-operated means for operating said brake, a controller comprising a casing and a rotatable valve-plug in said casing, said valve-plug and said casing having means whereby the brake is applied or released accordingly as the valve-plug is turned in one direction or the other, and whereby said brake has its application maintained when the valve-plug is held in mid-position, said casing having a passage leading from said fluid-pressure-operated means to the atmosphere, an auxiliary valve interposed in and normally closing this passage, a stem for said auxiliary valve mounted in said casing, a handle mounted on said plug for manually turning the plug in either direction, and means on said handle and means on said stem to coöperate for manually opening said auxiliary valve during every position of said plug.

42. In combination with a brake and fluid-pressure-operated means for operating said brake, a controller comprising a casing and a rotatable valve-plug in said casing, said valve-plug and said casing having means whereby the brake is applied or released accordingly as the valve-plug is turned in one direction or the other, and whereby said brake has its application maintained when the valve-plug is held in a mid-position, a bolt mounted in said valve-plug and engaging in said casing to prevent turning of the plug, a lock member to hold said bolt in engagement in said casing, a replenishing connection to said fluid-pressure-operated means, a replenishing valve interposed in and normally closing said replenishing connection, and operative connection from said bolt to said replenishing valve whereby said replenishing valve opens said replenishing connection when said bolt is held in engagement in said casing by said lock member.

43. In combination with a brake and fluid-pressure-operated means for operating said brake, a controller comprising a casing and a rotatable valve-plug in said casing, said valve-plug and said casing having means whereby the brake is applied or released accordingly as the valve-plug is turned in one direction or the other, and whereby said brake has its application maintained when the valve-plug is held in a mid-position, a bolt mounted in said plug and engaging in said casing to prevent turning of the plug from mid-position, a lock member to hold said bolt in engagement in said casing, a replenishing connection to said fluid-pressure-operated means, a replenishing valve interposed in and normally closing said replenishing connection, said casing having a segmental slot in it around the valve-plug adjacent to said replenishing valve, means on said replenishing valve projecting into said segmental slot, and means on said bolt projecting into said segmental slot to operatively engage with said means on said replenishing valve for opening the valve, when the valve-plug is in said mid-position.

44. In combination with a brake and fluid-pressure-operated means for operating said brake, a controller comprising a casing and a rotatable valve-plug in said casing, said valve-plug and said casing having means whereby the brake is applied or released accordingly as the valve-plug is turned in one direction or the other, and whereby said brake has its application maintained when the valve-plug is held in a mid-position, a bolt mounted in said valve-plug and engaging in said casing to prevent turning of the valve-plug, a lock member to hold said bolt in engagement in said casing, a replenishing connection to said fluid-pressure-operated means, a replenishing valve interposed in and normally closing said replenishing connection, operative connection from said bolt to said replenishing valve whereby said replenishing valve opens said replenishing connection when said bolt is held in engagement in said casing by said lock member, an atmospheric connection from said fluid-pressure-operated means to the atmosphere, an auxiliary valve interposed in and normally closing said atmospheric connection, means for opening said auxiliary valve during any position of said valve-plug, and means for locking said auxiliary valve against opening, actuated by said bolt when the bolt is held in engagement with said casing by said lock member.

45. In combination with a brake and fluid-pressure-operated means for operating said brake, a controller comprising a casing and a rotatable valve-plug in said casing, said casing and said valve-plug having means whereby the brake is applied or released accordingly as the valve-plug is turned in one direction or the other, and whereby said brake has its application maintained when the valve-plug is held in a mid-position, a sector in said casing at one side of said valve-plug, having a recessed middle part, a plug bolt yieldably mounted to slide transversely in said valve-plug to yieldably engage in said middle part of said sector, said casing having a passage leading from said fluid-pressure-operated means to the atmosphere, an auxiliary valve interposed in and normally closing this passage, a stem for said auxiliary valve mounted in said casing, means on said stem for opening said auxiliary valve during any position of said valve-plug, an auxiliary-valve bolt slidably mounted in said casing to engage with said auxiliary-valve stem, but normally yieldably held away from said auxiliary-valve stem and limiting the extension of said plug bolt into said middle part, and locking means in said valve-plug forcing said plug bolt farther into said middle part of said sector, and forcing said auxiliary-valve bolt against said auxiliary-valve stem to prevent movement of said valve-plug and said auxiliary-valve stem.

46. In combination with a brake and fluid-pressure-operated means for operating said brake, a controller comprising a casing, and a rotatable valve-plug in said casing, said valve-plug and said casing having means whereby the brake is applied or released accordingly as the valve-plug is turned in one direction or the other, and whereby said brake has its application maintained when the valve-plug is held in a mid-position, a sector in said casing at one side of said valve-plug, having a recessed middle part, a plug bolt yieldably mounted to slide transversely in said valve-plug to yieldably engage in said middle part of said sector, said casing having a passage leading from said fluid-pressure-operated means to the atmosphere, an auxiliary valve interposed in and normally closing this passage, auxiliary-valve-operating means for opening said auxiliary valve during any position of said valve-plug, a replenishing connection to said fluid-pressure-operated means, a replenishing valve interposed in and seating by movement away from said plug to close said replenishing connection, a spring normally seating said replenishing valve, said casing having a segmental slot in it around the valve-plug adjacent to said replenishing valve, a stem on said replenishing valve projecting into said segmental slot and a head on this stem, a stem on said plug bolt projecting into said segmental slot and a jaw on this stem to engage behind the head on said stem of said replenishing valve when the valve-plug is in said mid-position, an auxiliary-valve bolt slidably mounted in said casing to engage with said auxiliary-valve-operating means but normally yieldably held away from said means and limiting the extension of said plug bolt into said middle part, and locking means in said valve-plug, forcing said plug farther into said middle part of said sector and forcing said auxiliary-valve bolt against said auxiliary-valve-operating means, to prevent movement of said valve-plug and opening of said auxiliary-valve, said plug bolt then acting through said stems to pull said replenishing-valve open.

47. In combination with a brake and fluid-pressure-operated means for operating said brake, a controller comprising a casing, and a rotatable valve-plug in said casing, said valve-plug and said casing having means whereby the brake is applied or released accordingly as the valve-plug is turned in one direction or the other, and whereby said brake has its application maintained when the valve-plug is held in a mid-position, a sector in said casing at one side of said valve-plug, having a recessed middle part, a plug bolt yieldably mounted to slide transversely in said valve-plug to yieldably engage in said middle part of said sector, said casing having a passage leading from said fluid-pressure-operated means to the atmosphere, an auxiliary valve interposed in and normally closing this passage, a stem for said auxiliary valve mounted in said casing, means on said stem opening said auxiliary valve during any position of said valve-plug, a replenishing connection to said fluid-pressure-operated means, a replenishing valve interposed in and normally closing said replenishing connection, said casing having a segmental slot in it around the valve-plug adjacent to said replenishing valve, means on said replenishing valve projecting into said segmental slot, means on said plug bolt projecting into said segmental slot to operatively engage with said means on said replenishing valve when the valve-plug is in said mid-position, an auxiliary-valve bolt slidably mounted in said casing to engage with said auxiliary-valve stem but normally yieldably held away from said auxiliary-valve stem and limiting the extension of said plug bolt into said middle part, and locking means in said valve-plug, forcing said plug farther into said middle part of said sector and forcing said auxiliary-valve bolt against said auxiliary-valve stem, to prevent movement of said valve-plug and said auxiliary-valve stem, the means on said plug bolt then acting through said means on said replenishing-valve to open said replenishing-valve.

48. In combination with a brake and fluid-pressure-operated means for operating said brake, a controller comprising a casing and rotatable means in said casing, said rotatable means and said casing having means whereby the brake is applied or released accordingly as the rotatable means is turned in one direction or the other, and whereby said brake has its application maintained when the rotatable means is held in one position, locking means to hold said rotatable means in said position, normally held against locking or unlocking, and released for locking and unlocking by insertion of a key, and means whereby said key may be inserted or withdrawn either when said locking means is locked or when it is unlocked.

49. In combination with a brake and fluid-pressure-operated means for operating said brake, a controller comprising a casing and rotatable means in said casing, said rotatable means and said casing having means whereby the brake is applied or released accordingly as the rotatable means is turned in one direction or the other, and whereby said brake has its application maintained when the rotatable means is held in one position, a sector in said casing at one side of said rotatable means having a recessed part, a bolt mounted in said rotatable means, to engage with said recessed part of said sector, a rotatable lock-member mounted in said rotatable means, locking means holding the lock-member in one position, and released by insertion of a key into said locking means, and means whereby a single complete rotation of said lock-member causes a sliding of said bolt radially outwardly to hold it in said recessed part of the sector, or radially inwardly to hold it out of this part of said sector, whereby the key may be inserted or withdrawn during either position of said bolt.

50. In combination with a brake and fluid-pressure-operated means for operating said brake, a controller comprising a casing and rotatable means in said casing, said rotatable means and said casing having means whereby the brake is applied or released accordingly as the rotatable means is turned in one direction or the other, and whereby said brake has its application maintained when the rotatable means is held in one position, a sector in said casing at one side of said rotatable means having a recessed part, a bolt mounted in said rotatable means to engage with said recessed part of said sector, a rotatable lock-member mounted in said rotatable means, a disk rotatably mounted on said lock-member adjacent to said bolt, a pin fixed in said disk away from the center thereof, said bolt having a slot open at one side only and shorter than the stroke said pin has when said disk is rotated, said pin projecting into this slot, another disk fixed on said lock-member to rotate therewith and having a curved slot which the pin of the other disk projects into, and of length permitting a half rotation of this fixed disk without rotating the loose disk, and key-released means holding the lock-member in one position, from which position a complete rotation of said lock-member causes a half rotation of said disk and a sliding of said bolt radially outwardly to hold it in said middle part of the sector, or radially inwardly out of this part of said sector.

51. In a combination with a brake and fluid-pressure-operated means for operating said brake, a controller comprising a casing and rotatable means in said casing, said rotatable means and said casing having means whereby the brake is applied or released accordingly as the rotatable means is turned in one direction or the other, and whereby said brake has its application maintained when the rotatable means is held in a mid-position, a sector in said casing at one side of said rotatable means having a middle part and intermediate parts and end parts of successively decreasing displacement from the center of the rotatable means in both directions from the middle part, a bolt mounted in said rotatable means to yieldably engage with said parts of said sector, a rotatable lock-member mounted in said rotatable means, a disk rotatably mounted on said lock-member adjacent to said bolt, a pin fixed in said disk away from the center thereof, said bolt having a slot open at one side only and shorter than the stroke of said pin when said disk is rotated, said pin projecting into this slot, another disk fixed on said lock member to rotate therewith and having a curved slot which the pin of the other disk projects into, and of length permitting a half rotation of this fixed disk without rotating the loose disk, and key-released means holding the lock-member in one position, from which position a complete rotation of said lock-member causes a half rotation of said disk and a sliding of said bolt radially outwardly to hold it in the middle part of the sector, or radially inwardly to permit it to yield out of this part of sector into any others of said parts of the sector.

52. In combination with a brake, fluid-pressure-operated means for applying or releasing said brake, a fluid-conducting connection to said fluid-pressure-operated means, supply means to supply fluid under pressure to said means through said fluid-conducting connections, and a controller interposed in said connection comprising a casing and a plug rotatably mounted in said casing, said plug and casing having passages adapted to register variously to operate said brake, a neck on said plug projecting past the end of the casing, a nut screwed on said neck, said plug and casing having a depression around said neck deeper near the neck than radially outward therefrom, an elastic washer fitted in said depression, and a resilient washer of substantially wing-shaped cross-section, with its periphery thinner than its interior part, interposed between said nut and said elastic washer, said nut wedging into the wing-shaped cross-section of said resilient washer.

53. In combination with a brake, fluid-pressure-operated means for applying or releasing said brake, fluid-conducting connections to said fluid-pressure-operated means, supply means to supply fluid under pressure to said means through said fluid-conducting connections and a controller interposed in said connections between said supply means and said means for operating said brake, comprising a casing and a plug rotatably mounted in said casing, said plug and casing having passages adapted to register variously to variously operate said brake, a neck on said plug projecting past the end of the casing, a nut screwed on said neck, said plug and casing having a depression around said neck deeper near the neck than radially outward therefrom, an elastic washer fitted in said depression, a resilient washer of substantially wing-shaped cross-section, with its periphery thinner than its interior part, interposed between said nut and said elastic washer, said nut wedging into the wing-shaped cross-section of said resilient washer, a bolt slidable in said plug and a sector in said casing for the bolt to engage with, said casing having a groove around said plug communicating with the ends of said sector, and having a reservoir communicating with said groove and adapted to contain lubricant to be supplied to said plug, bolt and sector, under said washers.

54. In combination with a brake, fluid-pressure-operated means for operating said brake, and a controller for said means, comprising a casing and a tapered plug rotatably mounted in said casing, said plug and casing having passages adapted to register variously to variously operate said brake, a neck on said plug at its smaller end projecting past the end of the casing, a nut screwed on said neck, an elastic washer interposed between said nut and said casing, and lubricating means having a passage from the outside of the casing to said plug under said washer.

55. In combination with a brake, fluid-pressure-operated means for applying or releasing said brake, fluid-conducting connections to apply pressure to operate said brake, supply means to supply fluid under pressure to said means through said fluid-conducting connections, and a valve controller interposed in said connections between said supply means and said means for operating said brake, comprising a casing and a plug rotatably mounted in said casing, said plug and casing having passages adapted to register variously to variously operate said brake, a neck on said plug at each end thereof projecting past the respective end of the casing, nuts screwed on the respective necks, said plug and casing having depressions around said necks deeper near the necks than radially outward therefrom, elastic washers fitted in said depressions, resilient washers of substantially wing-shaped cross-section, with their peripheries thinner than their interior parts, interposed between said nuts and the respective elastic washers, each of said nuts wedging into the wing-shaped cross-section of its respective resilient washer, a bolt slidable in said plug and a sector in said casing for the bolt to engage with, said casing having a groove around said plug communicating with the ends of said sector, and having a reservoir communicating with said groove and adapted to contain lubricant to be supplied to said plug, bolt and sector, between said washers.

JAMES A. HICKS.

Witnesses:
JAMES N. RAMSEY,
CLARENCE PERDEW.